United States Patent [19]

Burba et al.

[11] 4,151,317

[45] Apr. 24, 1979

[54] POLYVINYL CHLORIDE PLASTISOLS AND METHOD OF COATING METAL THEREWITH

[75] Inventors: Christian Burba, Herbern; Hans-Guenter Volland, Unna; Norbert Esper, Bergkamen, all of Fed. Rep. of Germany

[73] Assignee: Schering Aktiengesellschaft, Berlin and Bergkamen, Fed. Rep. of Germany

[21] Appl. No.: 895,481

[22] Filed: Apr. 11, 1978

Related U.S. Application Data

[63] Continuation-in-part of Ser. No. 843483, Oct. 19, 1977, abandoned, which is a continuation of Ser. No. 667,995, Mar. 18, 1976, abandoned.

[30] Foreign Application Priority Data

Mar. 21, 1975 [DE] Fed. Rep. of Germany ....... 2512366

[51] Int. Cl.$^2$ ............................................. B05D 3/02
[52] U.S. Cl. .............................. 427/388 D; 260/324; 260/453 A; 260/566 F; 260/566 R; 427/388 A
[58] Field of Search .......... 427/388 C, 388 D, 388 A; 260/328 R, 566 R, 566 F, 453 A, 32.4; 526/344

[56] References Cited

U.S. PATENT DOCUMENTS

| | | | |
|---|---|---|---|
| 3,135,796 | 6/1964 | Layer et al. | 260/566 R |
| 3,180,885 | 4/1965 | Nentwig et al. | 260/566 F |
| 3,309,332 | 3/1967 | Skau et al. | 260/32.4 |
| 3,324,158 | 6/1967 | Cyba et al. | 260/566 F |
| 3,349,110 | 10/1967 | Cyba | 260/566 F |
| 3,368,974 | 2/1968 | Sparks | 260/566 F |
| 3,398,170 | 8/1968 | Cyba | 260/566 F |
| 3,440,087 | 4/1969 | Kanal | 427/388 A |
| 3,549,407 | 12/1970 | Williamson | 427/388 A |
| 3,674,695 | 7/1972 | Wuerstlin et al. | 260/566 F |
| 3,752,693 | 8/1973 | Suetsugi et al. | 427/388 A |
| 3,937,716 | 2/1976 | Lewis et al. | 260/566 R |

Primary Examiner—Ronald H. Smith
Assistant Examiner—Janyce A. Bell
Attorney, Agent, or Firm—Curtis, Morris & Safford

[57] ABSTRACT

In a method for coating metal by applying a polyvinyl chloride plastisol to the metal and baking the resultant coating, the improvement wherein the plastisol contains an adhesion improver which is an adduct formed between an isocyanate and a Schiff base (ketimine). Improved polyvinyl chloride plastisols for forming a protective coating on metal, said plastisols containing an adhesion improver which is an adduct formed between an isocyanate and a Schiff base (ketimine).

10 Claims, No Drawings

POLYVINYL CHLORIDE PLASTISOLS AND METHOD OF COATING METAL THEREWITH

This application is a continuation-in-part application of Ser. No. 843,483 filed Oct. 19, 1977, now abandoned, which in turn is a continuation application of Ser. No. 667,995 filed Mar. 18, 1976 and now abandoned.

The present invention relates to improved polyvinyl chloride plastisols and to a method for coating metal therewith.

The resistance to decomposition of coatings comprising polyvinyl chloride or its copolymers under the influence of aggressive media has long been known and has been broadly utilized, primarily for the protection of metallic surfaces against corrosion. Such coatings are usually applied by painting, roll coating, or spraying the surface of the material to be protected with vinyl chloride polymers containing plasticizers (i.e. plastisols). In a particularly widely-used form, such coating masses or plastisols comprise a polyvinyl chloride polymer which can be made into a paste and which is particularly distinguished by a definite ability to be swollen by a plasticizer, which polymer is present in the plastisol with a plasticizer or plasticizer mixture, fillers, and stabilizers, optionally together with coloring pigments and auxiliary materials which aid in working polyvinyl chloride.

As known in the art, plastisols are two-phase systems which lie in the border region between colloidal substances and those visible under an optical microscope. The resin is the inner, discontinuous, or dispersed phase and the plasticizer forms the external continuous phase or the dispersing agent. According to the amount and nature of the resin, and the method of preparing the resin and the plastisol, the resin component of plastisols has average particle sizes from 0.05 micron to 30 microns and more.

As further known in the art, plastisols have been made from polyvinyl chloride (PVC), vinyl chloride-vinyl acetate copolymers and other vinyl chloride copolymers, polyvinylidene chloride, vinylidene chloride copolymers, lower polyethylene oxides, low molecular weight polyethylenes, cellulose esters and cellulose ethers, and other homopolymers and copolymers. Those plastisols containing PVC or its copolymers are of greatest significance. Such plastisols may also contain colloidal mixures of PVC with other polymers such as acrylonitrile-butadiene-styrene or chlorinated polyethylene or polymethacrylic acid esters. These various known compositions are all characterized herein as "polyvinyl chloride plastisols".

The following materials have been used in the art as plasticizers: esters of phthalic, adipic, sebacic, phosphoric, citric and higher fatty acids; polyesters, generally those of adipic and sebacic acids; epoxidized synthetic esters and natural esters (e.g. oils); chlorinated aliphatic and aromatic compounds; and other solids and liquids of the most diverse chemical compositions.

Additives to the plastisols include heat- and light-stabilizers, viscosity controlling agents, cross-linking agents, lubricating agents, deaerating agents, dispersing auxiliaries, pigments, and dyes.

As known in the art, the ratio of resin to plasticizer can vary widely, being between about 85:15 and about 50:50 for polyvinyl chloride, for example. For example, for emulsion polyvinyl chloride having a K-value of 70 or 78, plastisols containing the least plasticizer contain the components in a ratio from 70:30 to 74:26. For suspension PVC, the ratio may be as much as 80:20.

A typical plastisol for machine application as a base layer on metals may have the following composition, in which all parts are by weight:

100 parts of emulsion PVC (or suspension PVC) having a K-value of about 70:

75–80 parts of di-2-ethylhexyl phthalate or mixtures of di-2-ethylhexyl phthalate and di-isononyl-or dinonyl-phthalate (e.g. 80:20) or of di-2-ethylhexyl phthalate and tricresyl phosphate (e.g. 90:10) or mixtures of other moderate to well-gelling plasticizers;

0–20 parts by weight (in replacement of about 0–15 parts by weight of the primary plasticizer) of plasticizers with particular properties (e.g. adipic acid di-2-ethylhexyl ester for improvement of the cold resistance and lowering of the viscosity; adipic acid- or sebacic acid-polyesters for improvement of resistance to oil, benzene, and heat, reduction of plasticizer migration and evaporation, or improvement of electrical properties;

6–8 parts of dibutyl phthalate, dibutyl adipate, tributyl phosphate, triisobutyl phosphate, tetrahydrofurfuryl adipate, or other very well-gelling plasticizers;

0–15 parts (instead of 0–10 parts of the primary plasticizer) of an extending plasticizer;

3–6 parts of an epoxidized plasticizer (e.g. epoxy octyl stearate or epoxidated soya bean oil) as a heat- and light-stabilizer;

1–3 parts by weight of barium-cadmium- or of barium-cadmium-zinc-phenolate-phosphite, or of zinc-organic compounds as heat- and light-stabilizers;

0–x parts by weight of pigments and dyes;

0–x/2 parts of filler (e.g. chalk, kaolin, barite);

1–6 parts of viscosity regulators and other additives (e.g. thickening and thixotroping agents, viscosity lowerers, cross-linking agents, dispersion auxiliaries, deaerating agents, etc.).

0–10 part of a light-protective agent, in case a colorless coating is present.

Numerous other plastisol compositions are disclosed, for example, in the article "Plastisole and Organosole" in Deutsche Farben-Zeitschrift 19, No. 3, 93–106 (1965), incorporated herein by reference.

Further information specifically concerning polyvinyl chloride plastisols may be found in the Kunststoff-Handbuch, Vol. 2, "Polyvinyl Chloride", pages 396–399, Carl Hanser Verlag, Muenchen (1963), also incorporated herein by reference.

It is known that an essential criterion for the evaluation of protective coatings applied in this manner is their adherence to the material being coated. This is of primary pertinence for coatings on metal parts. A weak adhesion of the protective layer increases the danger of penetration of aggresive media. For example, water may easily migrate under weakly-adhered layers and corrode the metal. This will be all the more possible, the weaker is the adhesion of the protective film to the metal.

It is also known, for example from German patent publication DAS No. 2,402,037, to employ polyamines and polyamidoamines as additives for modifying polyvinyl chloride plastisols, in particular to improve their adhesion. Aliphatic, cycloaliphatic, and aromatic amines do often improve adhesion, but can lead to a heavy brown discoloration and blister formation in plastisol coatings when the coatings are baked.

Thus, there is a need for plastisols having an improved property profile and for a method for preparing coatings on metallic materials with these plastisols.

According to the present invention, the known method for preparing coatings on metallic materials by coating them with finely-divided polyvinyl chloride or vinyl chloride copolymers containing plasticizers, fillers, additives, and/or adhesion improvers, followed by baking of the coatings at temperatures between 120° C. and 200° C. has been improved. More in particular, a feature of the improved method is the use, as an adhesion improver, of at least one addition product formed between an aliphatic or cycloaliphatic isocyanate and a ketimine (Schiff base) having from 0.1 to 1.4, preferably from 0.1 to 1.0, azomethine groups per 100 grams of the ketimine.

These compounds are used, alone or in admixture, in amounts from 0.1 to 4.0, preferably from 0.3 to 2.0, percent by weight of the polyvinyl chloride formulation. The optimum amount of adhesion improver is advantageously determined empirically, if necessary taking into account the content of azomethine groups.

A further feature of the present invention is an improved plastisol comprising finely-divided polyvinyl chloride or a polyvinyl chloride copolymer, together with conventional plasticizers, fillers, and additives, in which the aforementioned adhesion improvers are present, alone or in combination in the amounts mentioned above.

The particular advantages of the plastisols according to the present invention are: they can be baked at relatively low temperatures, namely between 120° C. and 160° C., to form coatings on metallic objects such as sheet metal body-work; they exhibit very good adhesion; and they do not lead to disturbing discolorations or structural defects and blister formation in the coating. In comparison with Schiff bases or enamines used per se as adhesion improvers in plastisols, the isocyanate adducts of the present invention give particularly good adhesion of the plastisols in which they are present on uncoated metal surfaces, on metal surfaces pre-coated with a paint, ground, or primer, and particularly on greasy surfaces such as are often found on metals treated to make them corrosion resistant.

The Schiff bases or ketimines used in forming the adducts of the invention have the characteristic group

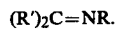

The adducts formed therefrom additionally contain urea or urethane groups.

The ketimines to be used according to the invention, which compounds are known per se, can be prepared from amines and ketones according to conventional processes such as those described, for example, in Norton et al., Journal of Organic Chemistry, 19 II, 1054–1065 (1954); C. Mannich et al., Ber. dtsch. chem. Ges. 69, 2106 (1936); and by S. K. Malhotra in A. G. Cook, "Enamines", pages 1–100 (particularly pages 56–65); M, Dekker, New York (1969).

Straight-chain or branched aliphatic polyamines having at least one, and preferably at least two, primary amino groups and one secondary amino group or heterocyclic amines having one secondary amino group, and at least one primary amino group, can be reacted with an aliphtic ketone to form the ketimines of interest. Such amines include diethylene triamine; and N-β-aminoethyl piperazine.

Aliphatic ketones useful in forming the ketimine include acetone, methyl ethyl ketone, diethyl ketone, and methyl isobutyl ketone.

Preferred ketimines are bis-ketimines formed between an aliphatic polyamine such as diethylene triamine and an aliphatic ketone, preferably methyl isobutyl ketone.

The ketimines are reacted in substantially stoichiometric amounts (based on active amine hydrogen atoms and isocyanate groups) with an aliphatic or cycloaliphatic polyisocyanate such as hexamethylene disocyanate, 2,4,4 (2,2,4)-trimethylhexamethylene diisocyanate, and isophorone diisocyanate (isocyanatomethyl-3,5,5-trimethyl-cyclohexyl isocyanate). In addition, pre-adducts of these isocyanates may be reacted with these ketimines, such as the pre-adducts formed between three molar parts of one of the aforementioned diisocyanates and one molar part of water. Also, a pre-adduct formed between three moles of isophorone diisocyanate and one mole of trimethylol propane is a preferred reactant. If desired, one isocyanate group of a diisocyanate may be capped prior to reaction of the remaining isocyanate group with a ketimine.

A better understanding of the present invention and of its many advantages will be had by referring to the following specific examples, given by way of illustration. Following Examples A–D illustrate the synthesis of typical adhesion improvers used in the plastisol formulations of the present invention, Example E illustrates a typical plastisol formulation, and Examples 1–4 illustrate the application of plastisols as coatings and the evaluation of the coatings.

EXAMPLE A

Preparation of a Schiff Base Containing Urethane and Urea Groups 314 g of diethylene triamine (amine number=1609) are heated to boiling with 750 g of methyl isobutyl ketone employing a water of reaction, until no more water is formed. The excess ketone is distilled off after the reaction is concluded.

The bis-ketimine product (amine number=585) has the structure

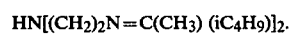

138.5 g of a solution, in ethylene glycol acetate, of an addition product formed between 3 moles of isophorone diisocyanate and 1 mole of trimethylol propane and having an NCO-content of 9.1 percent, are added dropwise at 30° C.–35° C. over the course of five hours to 86.4 g of the ketimine prepared above from diethylene triamine and methyl isobutyl ketone.

The product, which is a preferred adhesion improver, has the structure

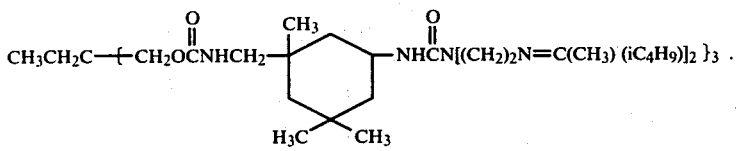

Suitably, 60 parts of the resultant product are mixed with 40 parts of methyl isobutyl ketone before further use.

EXAMPLE B

A di-ketimine is prepared in known fashion from diethylene triamine and excess methyl isobutyl ketone. After complete removal of water and of the excess ketone, finally in vacuum, a product having an amine number=615 (theory=630) is obtained.

110 g of the ketimine prepared in this manner are heated to 120° C. 44.4 g of isophorone diisocyanate are added dropwise at this temperature with vigorous stirring. A viscous product is obtained having the following properties:
Residual NCO: about 1 percent
Amine number: about 295

The product, which is a particularly preferred adhesion improver, has the formula

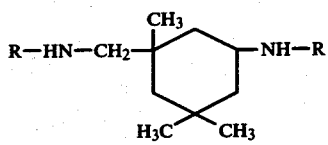

wherein R is

For practical use, it is recommended that the reaction product be diluted with xylene to form a 75 percent solution. Ethylene glycol acetate can also be used as a solvent.

EXAMPLE C

Preparation of a Schiff Base Containing Biuret Groups 217 g of a 75 percent solution, in ethylene glycol acetate, of a triisocyanate prepared from 9 g of water and 333 g of isophorone diisocyanate (NCO-content of the 75 percent solution=14.8 percent) are added dropwise with good cooling (maximum temperature 35° C.-40° C.) to 211 g of a Schiff base formed between diethylene triamine and methyl isobutyl ketone (amine number=160) and prepared as in Example A. The viscous solution obtained after completion of the exothermic reaction is diluted with additional ethylene glycol acetate to form an 80 percent solution. (amine number for the 80 percent solution=184).

The structure of the product, which is a preferred adhesion improver is where R' is

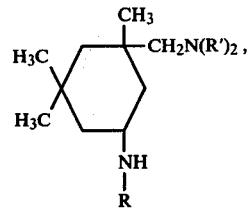

and R is

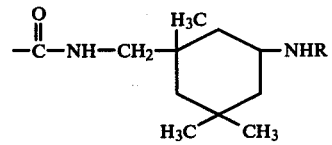

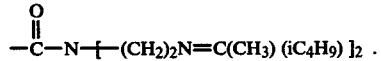

EXAMPLE D

Reaction Product of Partially-Capped (Caprolactam) Isophorone Diisocyanate and a Schiff Base Formed between Diethylene Triamine and Methyl Isobutyl Ketone 1556 g of isophorone diisocyanate are heated under nitrogen to 80° C.-90° C. 792 g of caprolactam are added portionwise over a period of about two hours. Because of the exothermic reaction, heating is turned off. The reaction product is stirred at 80° C.-90° C. until the NCO content=12.5 percent. By the addition of 414 g of ethyl glycol acetate, an 85 percent solution is obtained.

2500 g of the above described 85 percent solution of partially-capped isophorone diisocyanate are added dropwise at room temperature, with cooling and over a period of about 5 hours, to 1748 g of a Schiff base formed between diethylene triamine and methyl isobutyl ketone (amine number=610). By the addition of a further 156 g of ethylene glycol acetate, an 80 percent solution of the reaction product having the following characteristics is obtained: residual NCO=0.4 percent; amine number=169.

The structure of the product, which is a preferred adhesion improver, is

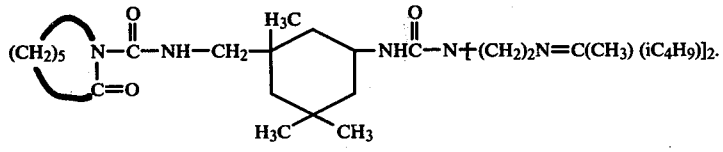

EXAMPLE E

A Typical Plastisol Formulation

A plastisol is prepared in conventional fashion from a polyvinyl chloride powder, a plasticizing agent, a filler, and a stabilizer, by intimately admixing the following:

45 parts of an emulsifier-containing polyvinyl chloride having a K-value of 70;
55 parts of phthalic acid di-2-ethylhexyl ester;
100 parts of a filler mixture comprising 50 percent of chalk and 50 percent of barium sulfate; and
1.5 parts of di-isobutyl-tin-di-isooctyl-thioglycolic acid ester.

Thereafter, the adhesion improvers according to the invention are added with stirring.

Plastisols prepared by combining the aforementioned adhesion improvers with the typical plastisol formulation of Example E were respectively applied to sheet metal with a coating apparatus in a layer thickness increasing from 0 to 3 mm and with a layer breadth of 3 cm. The coatings prepared in this manner were baked on for ½ hour at 130° C.–160° C. in a circulating air drying oven under conditions near to those encountered in practice.

After removal of the coated baked sheet metal and cooling to room temperature, an evaluation of the polyvinyl chloride coating was made both visually and manually. The criteria for judging the coating were:

(a) Strength of adhesion of the film to metal. A crescent shaped cut was made into the plastisol film with a knife and the adhesion of the film to the metal was qualitatively estimated by separating them.

(b) Color change. The coatings were judged according to the degree of their coloration.

(c) Determination of blistering of the film. A visual judgment was made on the basis of the blisters visible on the cut surface.

EXAMPLE 1

1.0 g of the adhesion improver of Example A was mixed with 100 g of the plastisol of Example E. The modified plastisol was applied in the manner described onto unlacquered sheet metal and baked for 30 minutes at 160° C. The strength of adhesion of the coating was very good. No discoloration was observed.

EXAMPLE 2

2.0 g of the adhesion improver of Example B were mixed with 100 g of the plastisol composition of Example E. The modified plastisol was applied in the manner described onto lacquered and unlacquered sheet metal and baked for 30 minutes at 130° C. No discoloration occurred. The strength of adhesion of the coating was very good in both cases.

EXAMPLE 3

2.0 g of the adhesion improver of Example C were mixed with 100 g of the plastisol of Example E. The plastisol so modified was applied in the fashion described onto lacquered and unlacquered sheet metal and baked for 30 minutes at 150° C. The adhesion of the coating, which showed only a slight yellow coloration, was very good in both cases.

EXAMPLE 4

2 g of the adhesion improver of Example D were combined with 100 g of the plastisol of Example E. The plastisol so modified was applied in the manner described onto lacquered and unlacquered sheet metal and baked for 30 minutes at 150° C. The adhesion of the slightly yellowish and blister-free coating was very good in both cases.

What is claimed is:

1. In a method for protectively coating metal which comprises applying to said metal a coating of a polyvinyl chloride plastisol containing an adhesion improver and then baking the coating at a temperature from about 120° C. to about 200° C., the improvement wherein said adhesion improver is from about 0.1 to about 4.0 percent, by weight of the plastisol, of an adduct formed between substantially equivalent amounts of
   (A) a ketimine containing from about 0.1 to about 1.4 azomethine groups per 100 grams of the compound; and
   (B) an isocyanate.

2. A method as in claim 1 wherein said ketimine is formed between an aliphatic polyamine and an aliphatic ketone.

3. A method as in claim 1 wherein said isocyanate is an aliphatic or cycloaliphatic isocyanate.

4. An improved polyvinyl chloride plastisol comprising from about 0.1 to about 4.0 percent, by weight of said plastisol, of an adduct formed between substantially equivalent amounts of:
   (A) a ketimine containing from about 1.0 to about 1.4 azomethine groups per 100 g of the compound; and
   (B) an isocyanate.

5. A plastisol as in claim 4 wherein said ketimine is formed between an aliphatic polyamine and an aliphatic ketone.

6. A plastisol as in claim 4 wherein said ketimine is a bis-ketimine formed between a polyaklylene polyamine and an aliphatic ketone.

7. A plastisol as in claim 6 wherein said polyalkylene polyamine is diethylene triamine.

8. A plastisol as in claim 6 wherein said aliphatic ketone is methyl isobutyl ketone.

9. A plastisol as in claim 4 wherein said isocyanate is an aliphatic or cycloaliphatic isocyanate.

10. A plastisol as in claim 9 wherein said isocyanate is isophorone diisocyanate.

* * * * *